US012645238B2

(12) United States Patent
Gomez et al.

(10) Patent No.: US 12,645,238 B2
(45) Date of Patent: Jun. 2, 2026

(54) DUAL LOW-POWER HIGH-POWER MODE VOLTAGE REGULATOR WITHOUT EXTERNAL COMPENSATION

(71) Applicant: Analog Devices International Unlimited Company, Limerick (IE)

(72) Inventors: Jose Tejada Gomez, Valencia (ES); Santiago Iriarte, Puzol (ES); Ruben Salvador, Valencia (ES)

(73) Assignee: Analog Devices International Unlimited Company, Limerick (IE)

( * ) Notice: Subject to any disclaimer, the term of this patent is extended or adjusted under 35 U.S.C. 154(b) by 365 days.

(21) Appl. No.: 18/220,166

(22) Filed: Jul. 10, 2023

(65) Prior Publication Data

US 2024/0103551 A1 Mar. 28, 2024

Related U.S. Application Data

(60) Provisional application No. 63/377,219, filed on Sep. 27, 2022.

(51) Int. Cl.

*G05F 1/56* (2006.01)
*G05F 1/565* (2006.01)
*G05F 1/66* (2006.01)

(52) U.S. Cl.

CPC ................ *G05F 1/565* (2013.01); *G05F 1/66* (2013.01)

(58) Field of Classification Search

CPC ... G05F 1/565; G05F 1/66; G06F 1/26; G06F 1/3287; H03K 19/0016

See application file for complete search history.

(56) References Cited

U.S. PATENT DOCUMENTS 8,400,862 B2 3/2013 Tejada
9,343,966 B1 5/2016 Thakur
10,620,676 B1 4/2020 Tejada et al.
2008/0054721 A1* 3/2008 Frew .......................... H02J 1/10 307/52
2008/0164765 A1* 7/2008 Illegems ................... G05F 1/56 307/80
2009/0164807 A1* 6/2009 Chi ........................... G06F 1/26 713/300
2011/0084552 A1 4/2011 Faerevaag
2014/0351615 A1* 11/2014 Gupta ................ H03K 19/0016 713/323

(Continued)

OTHER PUBLICATIONS

"European Application Serial No. 23196935.3, Extended European Search Report mailed Feb. 23, 2024", 15 pgs.

(Continued)

*Primary Examiner* — Lakaisha Jackson

(74) *Attorney, Agent, or Firm* — Schwegman Lundberg & Woessner, P.A.

(57) ABSTRACT

The present subject matter relates to an electronic system comprising gated circuitry, a first regulator circuit directly coupled to the gated circuitry, always-on circuitry, a second regulator circuit directly coupled to the always-on circuitry, and a switch circuit coupled between an output of the first regulator circuit and an output of the second regulator circuit. The always-on circuitry includes control logic configured to activate the second regulator circuit and deactivate the first regulator circuit and the switch circuit in a sleep mode and activate the first regulator circuit and the switch circuit in an active mode.

19 Claims, 3 Drawing Sheets

(56) References Cited

U.S. PATENT DOCUMENTS

| | | | | |
|---|---|---|---|---|
| 2015/0162055 | A1 | 6/2015 | Yoo et al. | |
| 2015/0177796 | A1* | 6/2015 | Bose | G06F 1/3296 713/300 |
| 2016/0041207 | A1* | 2/2016 | Cheng | G06F 1/3206 307/131 |

OTHER PUBLICATIONS

"European Application Serial No. 23196935.3, Response filed Sep. 11, 2024 to Extended European Search Report mailed Feb. 23, 2024", 24 pgs.

* cited by examiner

DUAL LOW-POWER HIGH-POWER MODE VOLTAGE REGULATOR WITHOUT EXTERNAL COMPENSATION

CLAIM OF PRIORITY

This application claims priority to U.S. Provisional Application Ser. No. 63/377,219, filed Sep. 27, 2022, which is incorporated by reference herein in its entirety.

FIELD OF THE DISCLOSURE

This document pertains generally, but not by way of limitation, to electronic circuits, and more particularly, to power-gated electronic circuits.

BACKGROUND

Electronic systems can include devices that require a regulated power source. As electronic systems continue to evolve, they require more complexity in a smaller size. The increase in complexity can come at the cost of increased power dissipation. Some electronic systems seek to reduce the power required during the time when the system is idle. However, some circuit functionality is still required even when the electronic system is in an idle or sleep mode. The electronic systems can include digital subsystems. Digital subsystems consumer power mainly due to logic switching of the digital circuits. Power used by the digital subsystem can be reduced by stopping the clock to the portion of the circuits not needed in the sleep mode. However, there is still a power drain from the circuits due to leakage while the clock is frozen.

Another approach to reducing power in a sleep mode is to remove power from the portion of the circuits not used in the sleep mode. This can be done by dividing the power supply to the circuits into multiple supply domains. One supply domain can be turned off in the low power idle mode and one supply domain can be turned on in the low power idle mode to provide supply power to the circuits active in the idle mode. However, having multiple supply domains presents challenges in keeping the size of the electronic system small. Switches to enable and disable separate supply domains need to be robust and can take up a large amount of area. Also, the supply domains need to be connected to external capacitors to filter one or more of the supply domains.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Electronic systems may implement a low power sleep mode to reduce power consumption. In a low power sleep mode, some circuits of the electronic system are disabled to conserve the energy consumed by their operation. The unused circuits can be disabled by removing power from the circuits. The circuit supply for the system can be divided into multiple supply domains. One supply domain is turned on in the low power sleep mode to provide power to the circuits needed in the sleep mode, while other supply domains can be turned off. When the system exits the sleep mode to an active mode, all supply domains are turned on.

Figure 1:
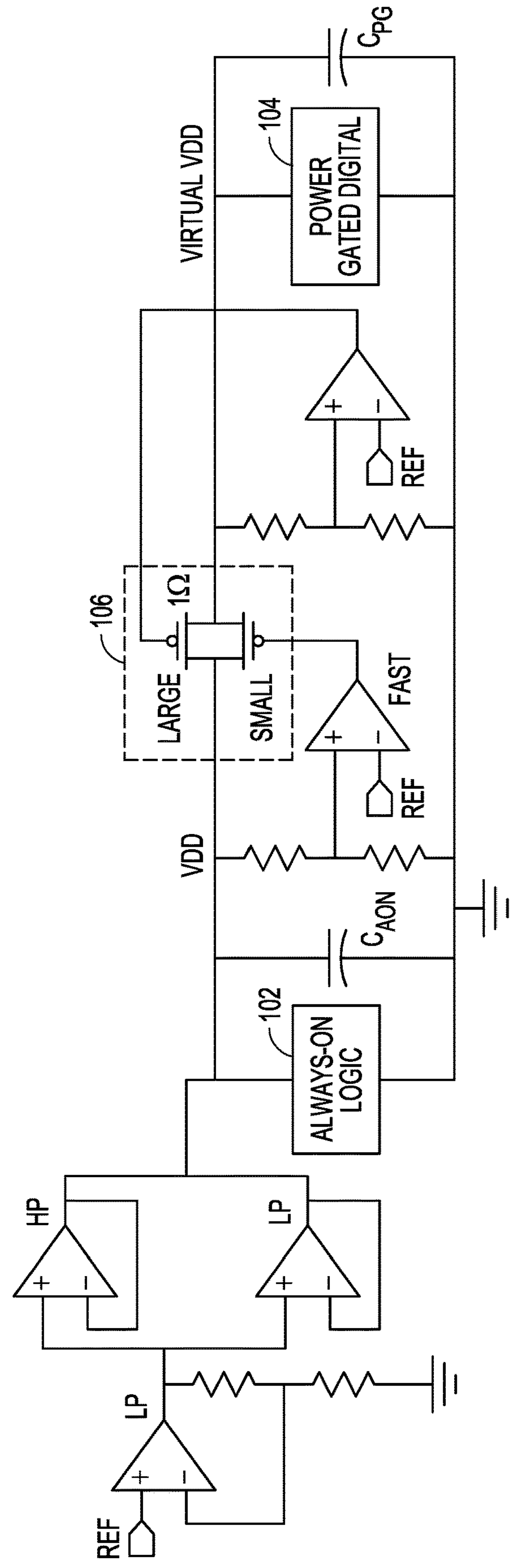
FIG. 1 is a schematic of an example of a circuit with power gating.

One approach to managing multiple supply domains is to use power gating techniques. FIG. 1 is a schematic of an example of a circuit with power gating. The circuit has two circuit supply domains (or circuit supply rails) VDD and virtual VDD. The VDD supply domain provides energy to the lower power always-on digital logic 102 and the virtual VDD supply domain provides energy to the higher power gated digital logic 104 when the virtual VDD supply domain is turned on. The gated digital logic 104 includes most of the digital circuitry and can include one or more processors and memories. The circuitry included in the always-on digital logic 102 is minimized to reduce the power needed. The always-on digital logic 102 includes logic used to detect the condition for activating the gated digital logic 104.

To turn on the virtual VDD supply domain, a switch 106 is arranged between the VDD domain and the virtual VDD domain. The switch 106 is enabled when the circuit exits the sleep mode and enters the active mode. In the approach of FIG. 1, a single supply rail is used, and the single supply rail is gated to the higher power gated digital logic 104 using a switch 106 that is in series with the VDD domain and the higher power gated digital logic 104. The current requirements of the gated digital logic 104 may require that the switch 106 needs to be large to have a low impedance to transfer a large amount of current from the VDD supply domain to the virtual VDD supply domain without a voltage drop between the VDD supply domain and the virtual VDD supply domain.

Figure 2:
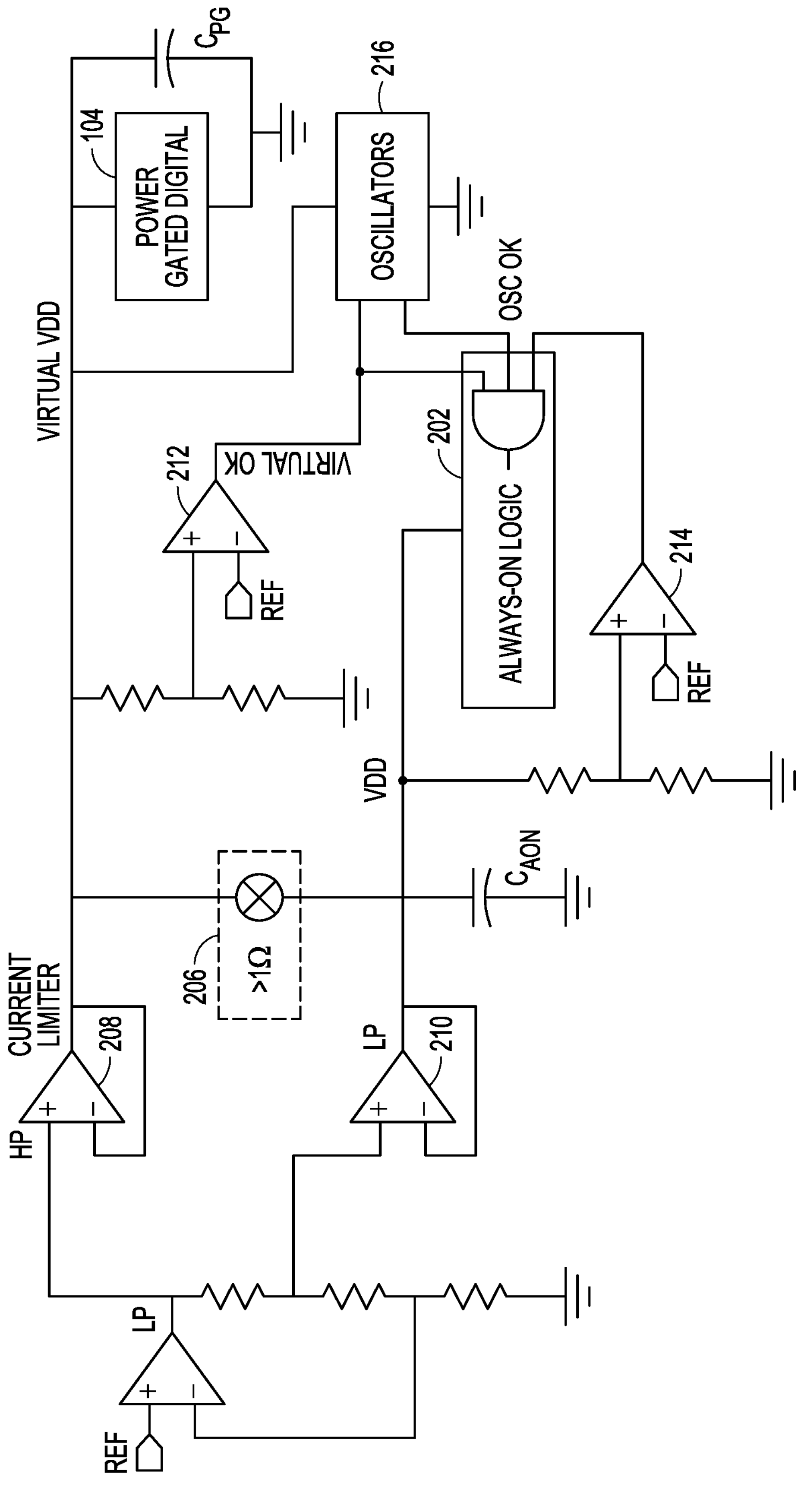
FIG. 2 is a schematic of an example of a circuit with multiple supply domains.

FIG. 2 is a schematic of another example of a circuit with multiple supply domains. The circuit includes Low Drop Out regulator circuits (LDOs). An LDO regulator is a direct current (DC) regulator that can provide a regulated output voltage even when the input voltage to the LDO is close to the output voltage of the LDO. The circuit example of FIG. 2 includes two LDO regulators. One LDO is a higher power (HP) regulator 208 with higher drive capability and the other is a (LP) regulator 210.

The circuit in FIG. 2 has two supply domains VDD and virtual VDD, but the virtual VDD domain is not gated from the VDD domain. The virtual VDD supply domain is directly connected to the HP regulator 208, and the HP regulator 208 is not connected to the virtual VDD supply domain through a switch as in the example of FIG. 1. The VDD supply domain is directly connected to the LP regulator 210. The circuit also includes a small switch circuit 206 connecting the output of the HP regulator 208 to the LP regulator 210 and the VDD supply domain to the virtual VDD supply domain.

The circuit in FIG. 2 includes higher power gated digital circuitry 104 and lower power always-on circuitry 202. The always-on circuitry 202 includes control logic to configure the circuit 200 in a sleep mode and an active mode, and detection circuitry to detect a condition for entering the active mode or the sleep mode. In the low power sleep mode, the HP regulator 208 is turned off. The virtual VDD supply domain and the gated digital circuitry 104 are also off. The LP regulator 210 provides a regulated circuit supply to the VDD supply domain to power the always-on circuitry 202.

The circuit 200 can include a fault detection circuit 214 that is also always-on, such as to detect a low battery condition. The oscillator circuitry 216 is also off in the sleep mode.

In the active mode, the HP regulator 208 is turned on. The higher power gated digital logic 104 is active and is powered directly by the HP regulator 208. The switch circuit 206 is turned on in the active mode and the always-on circuitry 202 operates using the output from the HP regulator 208. The LP regulator 210 may remain turned on in the active mode. In variations, the LP regulator 210 is turned off in the active mode.

Because the switch circuit 206 is not arranged in series with the higher power gated digital circuitry 104 and the HP regulator 208, there is much less current across it than across the switch 106 in the circuit of FIG. 1. Because the current across the switch circuit 206 is much smaller, the size of the switch circuit 206 can be much smaller (e.g., 10-30 times smaller) than the switch 106 in the circuit of FIG. 1. In some examples, the switch circuit 206 has an internal resistance of approximately one ohm (1Ω). Also, because the current across the switch circuit 206 is small, the switch circuit 206 could also have a relatively high impedance (e.g., 100 ohms) but still have a small enough voltage drop for the circuit to still work properly.

During the transition from sleep mode to active mode, the HP regulator 208 is turned on and the switch circuit 206 is initially still off. The voltage of the virtual VDD supply domain rises independently of the VDD supply domain. The circuit 200 includes a comparator 212 to detect when the virtual VDD supply domain reaches a predetermined threshold voltage. In some examples, the predetermined threshold voltage can be equal to a digital reset voltage level. In some examples, the predetermined threshold voltage is the voltage of the LP regulator 210. When the virtual VDD supply domain reaches the predetermined threshold voltage, the switch circuit 206 can be turned on. After being turned on, the HP regulator 208 may take over regulation of the VDD supply domain as well as the virtual VDD supply domain.

When returning to the sleep mode, the control logic of the always-on circuitry 202 may disable the gated digital circuitry 104 first before disabling the switch circuit 206. The control logic may disable the switch circuit 206 before disabling the HP regulator 208.

Both the circuits of FIG. 1 and FIG. 2 include a decoupling capacitor CAON to prevent droop in the VDD supply domain during switching. However, because the VDD supply domain is isolated from the virtual VDD supply domain during the transition to active mode until the virtual VDD supply domain reaches the predetermined threshold voltage, the decoupling capacitor in FIG. 2 can be smaller than in the circuit of FIG. 1. The larger capacitor of the circuit of FIG. 1 may need to be an external capacitor that is external to the integrated circuit (IC) die containing the circuit of FIG. 1 and the circuit needs to have an external connection to the external capacitor. Because the capacitor in the circuit of FIG. 2 is smaller, the decoupling capacitor can be internal to the circuit and the circuit of FIG. 2 can be used with regulator circuits that have only internal decoupling capacitors that are internal to the IC containing the circuit. The much smaller sized switch 206 and the smaller decoupling capacitance results in a circuit that can be much smaller than the power gating approach of the circuit of FIG. 1.

Figure 3:
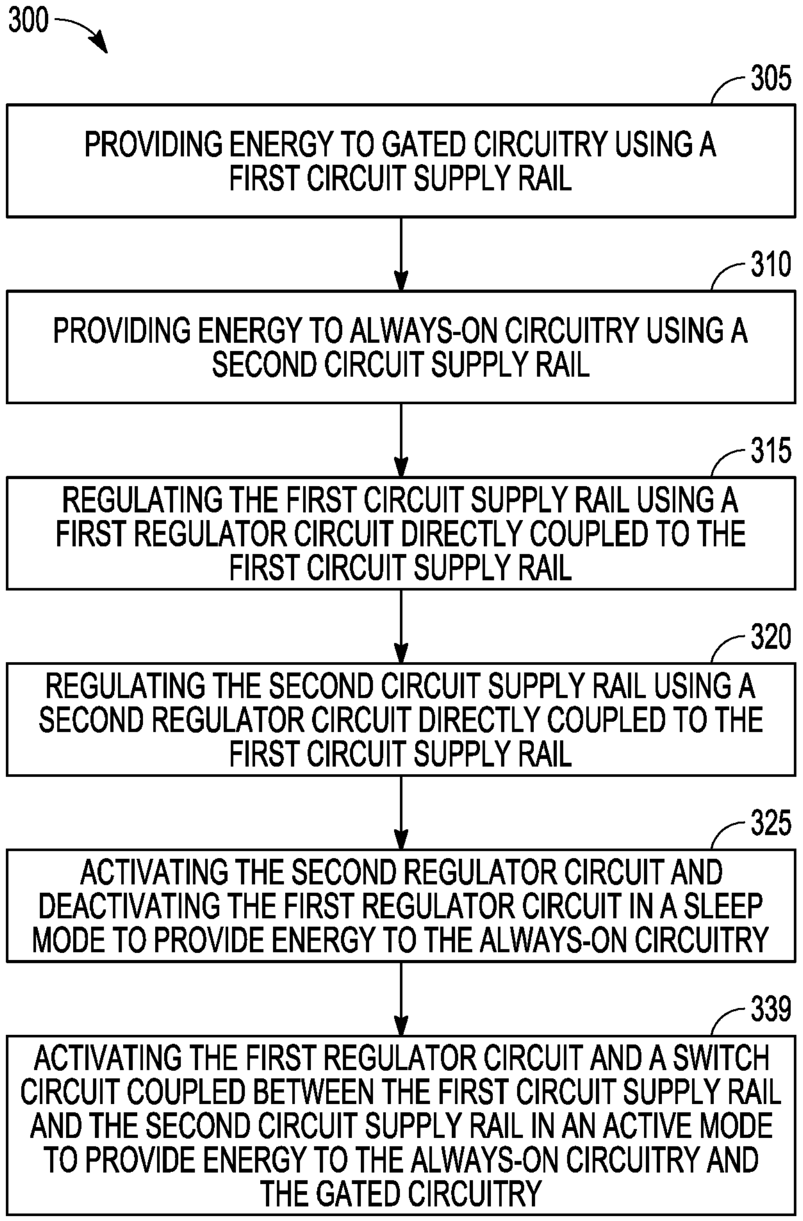
FIG. 3 is a flow diagram of an example of a method of operating a circuit supply of an electronic system.

For completeness, FIG. 3 is a flow diagram of an example of a method 300 of operating a circuit supply of an electronic system. At block 305, energy is provided to gated circuitry using a first circuit supply rail. At block 310, energy to always-on circuitry using a second circuit supply rail. The always-on circuitry uses less power than the gated circuitry.

At block 315, the first circuit supply rail is regulated using a first regulator circuit directly coupled to the first circuit supply rail. The first regulator circuit may be a HP regulator circuit. At 320, the second circuit supply rail is regulated using a second regulator circuit directly coupled to the first circuit supply rail. The second regulator circuit may be a low power regulator circuit.

At block 325, the first regulator circuit is deactivated, and the second regulator circuit is activated in a sleep mode to provide energy to the always-on circuitry in the sleep mode. At block 330, the first regulator circuit and a switch connected between the outputs of the first and second regulator circuits are activated in active mode to provide energy to the gated circuitry and the always-on circuitry in the active mode.

The method has many applications. For example, the always-on circuitry could detect the output of a capacitive sensor for a display screen (e.g., a touch sensitive display of a smartphone). The control logic of the always-on circuitry could deactivate the gated circuitry and place the device in a sleep mode when a timer of the gated circuitry times out due to no interaction of a user with the display screen. The always-on circuitry could place the device in active mode in response to output from the capacitive sensor indicating user interaction with the display screen. The circuit implementing the method can have a small size due to the small size of the switch needed between the circuit supply rails and the reduced decoupling capacitance needed.

Additional Description and Examples

Example 1 includes subject matter (such as an electronic system) comprising gated circuitry, a first regulator circuit directly coupled to the gated circuitry, always-on circuitry, a second regulator circuit directly coupled to the always-on circuitry, and a switch circuit coupled between an output of the first regulator circuit and an output of the second regulator circuit. The always-on circuitry includes control logic configured to activate the second regulator circuit and deactivate the first regulator circuit and the switch circuit in a sleep mode, and activate the first regulator circuit and the switch circuit in an active mode.

In Example 2, the subject matter of Example 1 optionally includes detection circuitry that detects when an output of the first regulator circuit reaches a predetermined threshold voltage after activation of the first regulator circuit in the active mode, and always-on circuitry configured to activate the switch circuit when the predetermined threshold voltage is reached.

In Example 3, the subject matter of one or both of Examples 1 and 2 optionally includes the first regulator circuit generating a regulated voltage for a first circuit supply domain of the electronic system and gated circuitry is supplied by the first circuit supply domain, the second regulator circuit generating a regulated voltage for a second circuit supply domain of the electronic system, and the always-on circuit supplied by the second circuit supply domain in the sleep mode and by the first circuit supply domain in the active mode.

In Example 4, the subject matter of Example 3 optionally includes the first regulator circuit being directly coupled to the first circuit supply domain without a power switch between the first regulator circuit and the first circuit supply domain.

In Example 5, the subject matter of one or any combination of Examples 1-4 optionally includes the switch circuit having an internal resistance of one ohm.

In Example 6, the subject matter of one or any combination of Examples 1-4 optionally includes the switch circuit having an internal resistance in the range of one ohm to one hundred ohms.

In Example 7, the subject matter of one or any combination of Examples 1-6 optionally includes a decoupling capacitor connected to the second regulator circuit, and the first and second regulator circuits being included in an integrated circuit die and the decoupling capacitor being included in the integrated circuit die.

In Example 8, the subject matter of one or any combination of Examples 1-7 optionally includes fault detection circuitry configured to detect a fault when the electronic system in the sleep mode.

In Example 9, the subject matter of one or any combination of Examples 1-8 optionally includes always-on circuitry configured to, when entering the sleep mode from the active mode, disable the gated circuitry before disabling the switch circuit and disable the switch circuit before deactivating the first regulator circuit.

Example 10 includes subject matter (such as a method of operating a circuit supply of an electronic system) or can optionally be combined with one or any combination of Examples 1-9 to include such subject matter, comprising providing energy to gated circuitry using a first circuit supply rail, providing energy to always-on circuitry using a second circuit supply rail, regulating the first circuit supply rail using a first regulator circuit directly coupled to the first circuit supply rail, regulating the second circuit supply rail using a second regulator circuit directly coupled to the first circuit supply rail, deactivating the first regulator circuit and activating the second regulator circuit in a sleep mode to provide energy to only the always-on circuitry, and activating the first regulator circuit and a switch circuit coupled between the first circuit supply rail and the second circuit supply rail in an active mode to provide energy to the always-on circuitry and the gated circuitry.

In Example 11, the subject matter of Example 10 includes detecting when an output of the first regulator circuit reaches a predetermined threshold voltage after activation the first regulator circuit, and activating the switch circuit when the predetermined threshold voltage is reached.

In Example 12, the subject matter of one or both of Examples 10 and 11 optionally includes shorting an output of the first regulator circuit to an output of the second regulator circuit.

In Example 13, the subject matter of one or any combination of Examples 10-12 optionally includes regulating using a first regulator circuit directly coupled to the first circuit supply rail without a power switch connected between the first regulator circuit and the first circuit supply rail.

Example 14 includes subject matter (such as an integrated circuit die) or can optionally be combined with one or any combination of Examples 1-13 to include such subject matter, comprising a first regulator circuit directly coupled to a first circuit supply domain to provide a regulated output to the first circuit supply domain, gated digital circuitry powered by the first circuit supply domain, a second regulator circuit directly coupled to a second circuit supply domain to provide a regulated output to the second circuit supply domain, a switch circuit coupled between the output of the first regulator circuit and the output of the second regulator circuit, and always-on circuitry powered by the second circuit supply domain. The always-on circuitry includes control logic configured to activate the second regulator circuit and deactivate the first regulator circuit and the switch circuit in a sleep mode, and activate the first regulator circuit and the switch circuit in an active mode.

In Example 15, the subject matter of Example 14 optionally includes a decoupling capacitor internal to the IC die and connected to the second circuit supply domain.

In Example 16, the subject matter of one or both of Examples 14 and 15 optionally includes detection circuitry that detects when an output of the first regulator circuit reaches a predetermined threshold voltage after activation of the first regulator circuit in the active mode, and always-on circuitry configured to activate the switch circuit when the predetermined threshold voltage is reached.

In Example 17, the subject matter of one or any combination of Examples 14-16 optionally includes the switch circuit having an internal resistance of one ohm.

In Example 18, the subject matter of one or any combination of Examples 14-16 optionally includes the switch circuit having an internal resistance in the range of one ohm to one hundred ohms.

In Example 19, the subject matter of one or any combination of Examples 14-18 optionally includes first regulator circuit being directly coupled to the first circuit supply domain without a power switch between the first regulator circuit and the first circuit supply domain.

In Example 20, the subject matter of one or any combination of Examples 14-19 optionally includes gated digital circuitry that includes one or more processors.

These non-limiting Examples can be combined in any permutation or combination. The above detailed description includes references to the accompanying drawings, which form a part of the detailed description. The drawings show, by way of illustration, specific embodiments in which the invention can be practiced. These embodiments are also referred to generally as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following aspects, the terms "including" and "comprising" are open-ended, that is, a system, device, article, composition, formulation, or process that includes elements in addition to those listed after such a term in a claim are still deemed to fall within the scope of that claim. Moreover, in the following aspects, the terms "first," "second," and "third," etc., are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Such instructions can be read and executed by one or more processors to enable performance of operations comprising a method, for example. The instructions are in any suitable form, such as but not limited to source code, compiled code, interpreted code, executable code, static code, dynamic code, and the like.

Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following aspects are hereby incorporated into the Detailed Description as examples or embodiments, with each aspect standing on its own as a separate embodiment, and it is contemplated that such embodiments can be combined with each other in various combinations or permutations.

The invention claimed is:

1. An electronic system, the electronic system comprising:
- gated circuitry;
- a first regulator circuit directly coupled to the gated circuitry;
- always-on circuitry;
- a second regulator circuit directly coupled to the always-on circuitry;
- a switch circuit coupled between an output of the first regulator circuit and an output of the second regulator circuit; and
- wherein the always-on circuitry includes control logic configured to:
- activate the second regulator circuit and deactivate the first regulator circuit and the switch circuit in a sleep mode; and
- activate the first regulator circuit and the switch circuit in an active mode; and
- when entering the sleep mode from the active mode, disable the gated circuitry before disabling the switch circuit and disable the switch circuit before deactivating the first regulator circuit.

2. The electronic system of claim 1, including:
- detection circuitry that detects when the output of the first regulator circuit reaches a predetermined threshold voltage after activation of the first regulator circuit in the active mode; and
- wherein the always-on circuitry is configured to activate the switch circuit when the predetermined threshold voltage is reached.

3. The electronic system of claim 1,
- wherein the first regulator circuit generates a regulated voltage for a first circuit supply domain of the electronic system and gated circuitry is supplied by the first circuit supply domain; and
- wherein the second regulator circuit generates a regulated voltage for a second circuit supply domain of the electronic system and the always-on circuit is supplied by the second circuit supply domain in the sleep mode and by the first circuit supply domain in the active mode.

4. The electronic system of claim 3, wherein the first regulator circuit is directly coupled to the first circuit supply domain without a power switch between the first regulator circuit and the first circuit supply domain.

5. The electronic system of claim 1, wherein the switch circuit has an internal resistance of one ohm.

6. The electronic system of claim 1, wherein the switch circuit has an internal resistance in the range of one ohm to one hundred ohms.

7. The electronic system of claim 1, including:
- a decoupling capacitor connected to the second regulator circuit; and
- wherein the first and second regulator circuits are included in an integrated circuit die and the decoupling capacitor is included in the integrated circuit die.

8. The electronic system of claim 1, including fault detection circuitry configured to detect a fault when the electronic system in the sleep mode.

9. A method of operating a circuit supply of an electronic system, the method comprising:
- providing energy to gated circuitry using a first circuit supply rail;
- providing energy to always-on circuitry using a second circuit supply rail;
- regulating the first circuit supply rail using a first regulator circuit directly coupled to the first circuit supply rail;
- regulating the second circuit supply rail using a second regulator circuit directly coupled to the first circuit supply rail;
- deactivating the first regulator circuit and activating the second regulator circuit in a sleep mode to provide energy to only the always-on circuitry; and
- activating the first regulator circuit and a switch circuit coupled between the first circuit supply rail and the second circuit supply rail in an active mode to provide energy to the always-on circuitry and the gated circuitry; and
- when entering the sleep mode from the active mode, disabling the gated circuitry before disabling the switch circuit and disabling the switch circuit before deactivating the first regulator circuit.

10. The method of claim 9, wherein activating the first regulator circuit includes:
- detecting when an output of the first regulator circuit reaches a predetermined threshold voltage after activation the first regulator circuit; and
- activating the switch circuit when the predetermined threshold voltage is reached.

11. The method of claim 9, wherein activating the switch circuit includes shorting an output of the first regulator circuit to an output of the second regulator circuit.

12. The method of claim 9, wherein the regulating the first circuit supply rail includes regulating using the first regulator circuit directly coupled to the first circuit supply rail without a power switch connected between the first regulator circuit and the first circuit supply rail.

13. An integrated circuit (IC) die, comprising:

a first regulator circuit directly coupled to a first circuit supply domain to provide a regulated output to the first circuit supply domain;

gated digital circuitry powered by the first circuit supply domain;

a second regulator circuit directly coupled to a second circuit supply domain to provide a regulated output to the second circuit supply domain;

a switch circuit coupled between the output of the first regulator circuit and the output of the second regulator circuit; and always-on circuitry powered by the second circuit supply domain and including control logic configured to:

activate the second regulator circuit and deactivate the first regulator circuit and the switch circuit in a sleep mode; and activate the first regulator circuit and the switch circuit in an active mode; and when entering the sleep mode from the active mode, disable the gated circuitry before disabling the switch circuit and disable the switch circuit before deactivating the first regulator circuit.

14. The IC die of claim 13, including a decoupling capacitor internal to the IC die and connected to the second circuit supply domain.

15. The IC die of claim 13, including:

detection circuitry that detects when an output of the first regulator circuit reaches a predetermined threshold voltage after activation of the first regulator circuit in the active mode; and wherein the always-on circuitry is configured to activate the switch circuit when the predetermined threshold voltage is reached.

16. The IC die of claim 13, wherein the switch circuit has an internal resistance of one ohm.

17. The IC die of claim 13, wherein the switch circuit has an internal resistance in the range of one ohm to one hundred ohms.

18. The IC die of claim 13, wherein the first regulator circuit is directly coupled to the first circuit supply domain without a power switch between the first regulator circuit and the first circuit supply domain.

19. The IC die of claim 13, wherein the gated digital circuitry includes one or more processors.

* * * * *